(12) United States Patent
Arpino

(10) Patent No.: US 8,215,549 B2
(45) Date of Patent: Jul. 10, 2012

(54) AUTOMATIC REMOTE ACQUISITION SYSTEM FOR DETERMINING THE CONFIGURATION OF AN INSTALLATION

(75) Inventor: Michele Arpino, Naples (IT)

(73) Assignee: Selex Sistemi Integrati, S.p.A., Rome (IT)

( * ) Notice: Subject to any disclaimer, the term of this patent is extended or adjusted under 35 U.S.C. 154(b) by 940 days.

(21) Appl. No.: 11/915,153

(22) PCT Filed: Aug. 5, 2005

(86) PCT No.: PCT/IT2005/000478
§ 371 (c)(1),
(2), (4) Date: Mar. 27, 2008

(87) PCT Pub. No.: WO2006/123377
PCT Pub. Date: Nov. 23, 2006

(65) Prior Publication Data
US 2008/0191005 A1  Aug. 14, 2008

(30) Foreign Application Priority Data
May 20, 2005  (IT) .............................. TO2005A0350

(51) Int. Cl.
G06F 19/00 (2011.01)
G06Q 30/00 (2012.01)
G06Q 90/00 (2006.01)

(52) U.S. Cl. ........ 235/385; 235/375; 235/383; 235/451; 235/492; 340/10.2; 340/572.1; 340/572.2; 340/572.7

(58) Field of Classification Search .................. 235/375, 235/383, 385, 451, 492; 705/14, 22; 340/572.1, 340/10.1, 10.2, 572.2, 572.7, 572.8
See application file for complete search history.

(56) References Cited

U.S. PATENT DOCUMENTS

| 6,405,102 | B1 | 6/2002 | Swartz et al. |
| 6,600,418 | B2 * | 7/2003 | Francis et al. ............. 340/572.1 |
| 6,900,731 | B2 * | 5/2005 | Kreiner et al. ............. 340/572.1 |
| 7,123,126 | B2 * | 10/2006 | Tanaka et al. ................. 340/5.2 |
| 2003/0057279 | A1 | 3/2003 | Uozumi et al. |
| 2003/0144985 | A1 * | 7/2003 | Ebert ................................. 707/1 |
| 2004/0075616 | A1 | 4/2004 | Endo et al. |
| 2004/0108378 | A1 | 6/2004 | Gatz |
| 2004/0144842 | A1 * | 7/2004 | Brignone et al. ............. 235/385 |
| 2005/0109845 | A1 * | 5/2005 | Ghaffari ........................ 235/385 |
| 2006/0244652 | A1 * | 11/2006 | Tethrake et al. ................ 342/44 |

FOREIGN PATENT DOCUMENTS
NL 1016686 5/2002
WO WO 01/80174 10/2001

* cited by examiner

Primary Examiner — Thien M. Le
Assistant Examiner — Tuyen K Vo
(74) Attorney, Agent, or Firm — Klarquist Sparkman, LLP

(57) ABSTRACT

There is described an automatic remote acquisition system for determining the configuration of an installation having a number of devices, which are divided into standard devices grouped by cabinets, and into non-standard devices, and are each defined by a respective number of elementary units. The remote acquisition system has a number of passive transponders, each associated with a respective elementary unit to memorize respective identification data of the elementary unit; a number of active transponders, each associated with a respective non-standard device to memorize at least the identification data of the respective number of elementary units; and, for the passive transponders, a number of control units, each mounted in a respective cabinet to acquire the identification data, memorized in the respective passive transponders, of the elementary units of the standard devices in the cabinet.

20 Claims, 6 Drawing Sheets

AUTOMATIC REMOTE ACQUISITION SYSTEM FOR DETERMINING THE CONFIGURATION OF AN INSTALLATION

CROSS-REFERENCE TO RELATED APPLICATIONS

This is a National Stage of International Application No. PCT/IT2005/000478, filed Aug. 5, 2005, which claims priority to Italian patent application TO2005A000350, filed May 20, 2005, both of which are incorporated herein by reference.

TECHNICAL FIELD

The present invention relates to an automatic remote acquisition system for determining the configuration of an installation.

The present invention may be used to particular advantage, though not exclusively, in an installation installed and activated at different stages, to which the following description refers purely by way of example.

BACKGROUND ART

Setting up a technologically advanced installation, such as a ground system, a submarine, etc., represents an enormous investment on the part of the owner, who, to safeguard his investment, often requests that the manufacturer or installation firm also provide for high-level, long-term servicing of the installation. In fact, it is not unusual for a technologically advanced installation to continue operating well past its time, e.g. even 40 years after it is installed, thanks to continual technological updating of the original installation structure.

Servicing an installation normally comprises:
repairs;
spare parts supply;
customized installation programming and updating;
running the installation;
training of installation technicians;
integration with the owner's existing equipment or servicing procedures.

Servicing involves working in collaboration with installation technicians, which means devising, in conjunction with installation technicians, appropriate processes to maximize efficiency and prompt service, and to keep track of the work carried out and the equipment installed, so that the exact configuration of the installation is known at all times. In other words, the manufacturer or installation firm must maintain full control over the servicing chain, in the sense of knowing exactly the configuration of the installation and the availability of spare parts and servicing material.

A computer network is a definite and indispensable aid to all aspects of servicing work, by constructing and maintaining a centralized data bank constituting an inventory of parts and elementary units (LRU—"Logic Replaceable Unit") of which the installation is composed. A centralized data bank, however, is only effective to the extent that the data in it is correct, updated and reliable.

The parts and elementary units of an installation are identified using various identification systems, one of the cheapest of which is based on the use of bar codes. More specifically, an unequivocal bar code is assigned to each part and each elementary unit in the installation, and is normally printed on a label applied to the respective installation part or elementary unit.

A bar code system, however, is not the best or most efficient solution to the above problems, for the following main reasons:

the enormous number of references involved, and the complex, variable, and, very often, unique nature of the elementary units associated with the references; a bar code system therefore calls for continually producing and applying different labels, and for appropriate printers, thus increasing running costs (labels, ribbons, maintenance).

in non-industrial environments, reading bar code labels is intentional, and is therefore performed manually by the operator on a portable terminal;

remote bar code reading is only possible using highly complex systems (multiple or robotized readers);

bar codes are read sequentially (one at a time), so that inventories take longer;

a bar code has no memory, the only information being the code reading, which is decoded by access to the data bank; and to be changed, a bar code label must be physically replaced.

The drawbacks of the bar code system can be eliminated using a known RFid ("Radio Frequency Identification") system, which is based on the use of radiofrequency tags known as "tag transponders" or, more simply, "transponders", which are applied to respective elementary units for identification.

As shown in FIG. 1, a transponder 101 typically comprises a microchip 102 having an electronic memory (not shown); and a normally miniaturized antenna 103. In actual use, transponder 101 is excited, via antenna 103, by the electromagnetic field generated by an external (fixed or portable) RFid read/write device 104, with which it dialogues by radio, and to which it returns the identification code and/or any other information memorized in microchip 102. The external RFid read/write device 104 is normally connectable to a computer device 105 for collecting the identification code and/or any other memorized information.

Transponder 101 also comprises a capacitor (not shown), in which case, transponder 101 is passive, or a small battery (not shown), in which case, transponder 101 is active. Transponder 101 may also be rewritable, for remote programming with additional data, or for complete reprogramming with a new "identity".

FIG. 2 shows a few examples of transponders 101 of different sizes, which depend on performance requirements, and on the size of the elementary units to which they are applied.

RFid technology provides for solving almost all the drawbacks of bar codes, in that each transponder:

identifies a respective part or elementary unit of the installation with an unequivocal code memorized in its microchip, and is capable of acquiring and memorizing additional data and making it available substantially in real time;

is of the desired shape and size, and can be covered with appropriate material for the type of operation involved;

can be reused, in production or logistics, to perform an infinite number of read/write operations;

unlike bar code labels, can be used in any environment, i.e. in the presence of dirt, water, detergents, paint, chemical solvents, and high temperature;

is readable even when concealed, in inaccessible conditions, free-handedly, and unattended;

is recommended when the respective installation part or component is "followed" by additional data, and so involves memorizing and/or reading data relating, for example, to work progress, maintenance work carried out, tracking, product tracing or authentication (imitation prevention: cannot be photocopied); and prevents theft, with the provision of appropriate security thresholds.

Notwithstanding all this, inventory work is hampered, and inventory data made outdated, by a whole host of installation configuration changes that are difficult to trace. Outdated inventory data, in particular, can be attributed to the type of installation and the maintenance work carried out, for example:

remote installation that cannot be moved for reasons of security or non-stop service;

emergency configuration repairs and changes;

configuration changes made by installation operatives without informing the Service Department;

inaccessible installation, e.g. stationed in military or reserved areas.

Moreover, the RFid identification system is affected by transponder read noise—particularly in the case of passive transponders—caused by numerous situations, in which the magnetic component of the electromagnetic field generated by the RFid read/write device is distorted or attenuated to the point of drastically reducing the energy absorbed by the transponder antenna. More specifically, transponder reading is disturbed by:

reflection of the electromagnetic field on metal walls or walls made of electrically conducting material in the vicinity of the transponder ("echo" effect);

distortion of the electromagnetic field flux lines, caused by the presence of metal or electrically conducting material in the vicinity of the transponder;

the presence of pole fluids (such as distilled water) which absorb the magnetic component; and stray capacitances introduced by metal walls of installation parts or elementary units, to which the transponder is fitted.

The presence of metal in the vicinity of the transponder, in particular, impairs the signal/noise S/N ratio of the transponder to the extent of making the transponder unsuitable for use close to electronic circuits, which greatly increase ambient electromagnetic noise.

DISCLOSURE OF INVENTION

It is an object of the present invention to provide an automatic remote acquisition system for determining the configuration of an installation, a method of designing a passive transponder for such a system, and a passive transponder designed in accordance with such a method, which provide for eliminating the aforementioned drawbacks.

According to the present invention, there are provided an automatic remote acquisition system for determining the configuration of an installation, as claimed in claim 1; a method of designing a passive transponder, as claimed in claim 14; and a passive transponder, as claimed in claim 15.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

The automatic remote acquisition system for determining the configuration of an installation in accordance with the present invention—hereinafter referred to simply as STC system—observes the following guide lines:

use of "open" technology to permit system scalability, maintenance, and incremental growth;

modular construction for smooth migration to future technology;

use of standard interface and connectivity solutions to permit integration in the installation of additional COTS ("Commercial Off The Shelf") equipment of different makes;

use of state-of-the-art COTS components; and low running cost.

An installation 1 (FIG. 3) normally comprises a number of different types of elementary units 2 (FIG. 3), such as radars, display equipment, dedicated computers, work stations, etc., which may also differ as to version or degree of customization. Elementary units 2 are assigned respective identification codes, which are grouped into varying configurations defining subsystems incorporated in further, more complex higher-level, subsystems according to a specific multilevel hierarchical structure.

Figure 1:
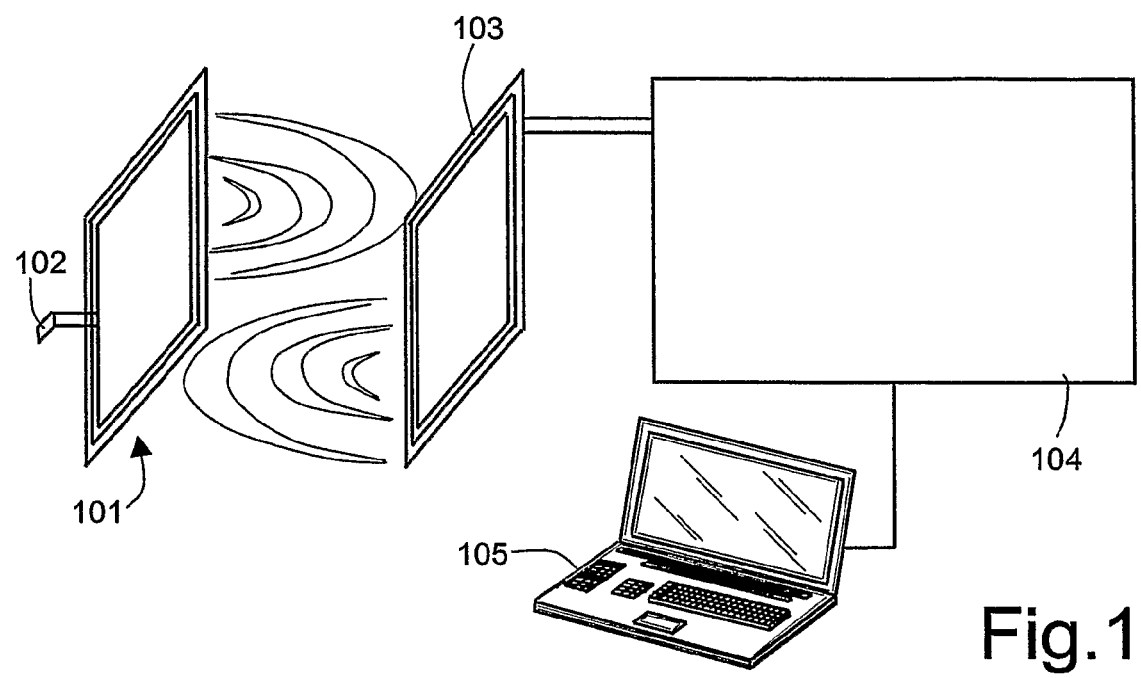
FIG. 1 shows an RFid-technology identification system.
Figure 2:
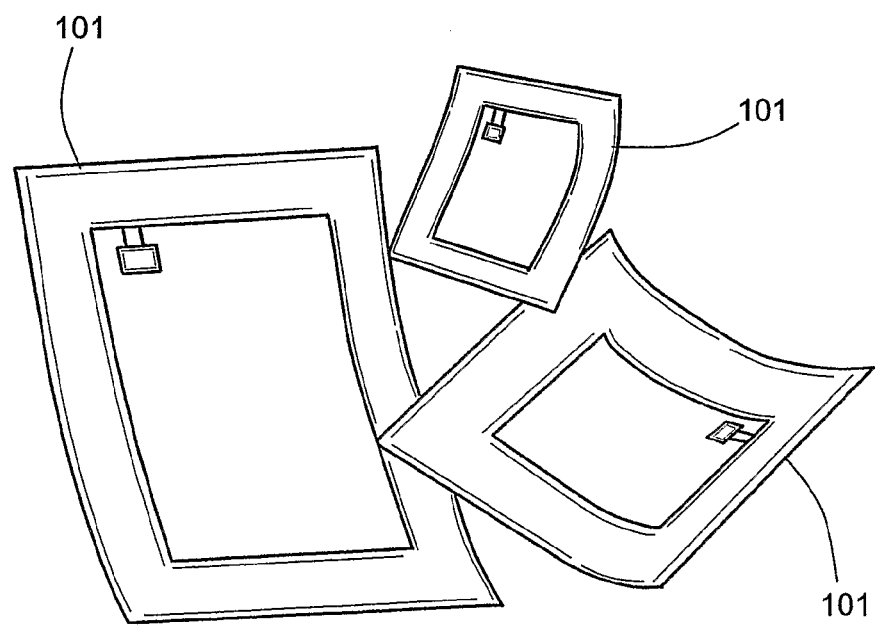
FIG. 2 shows examples of transponders of different sizes.
Figure 3:
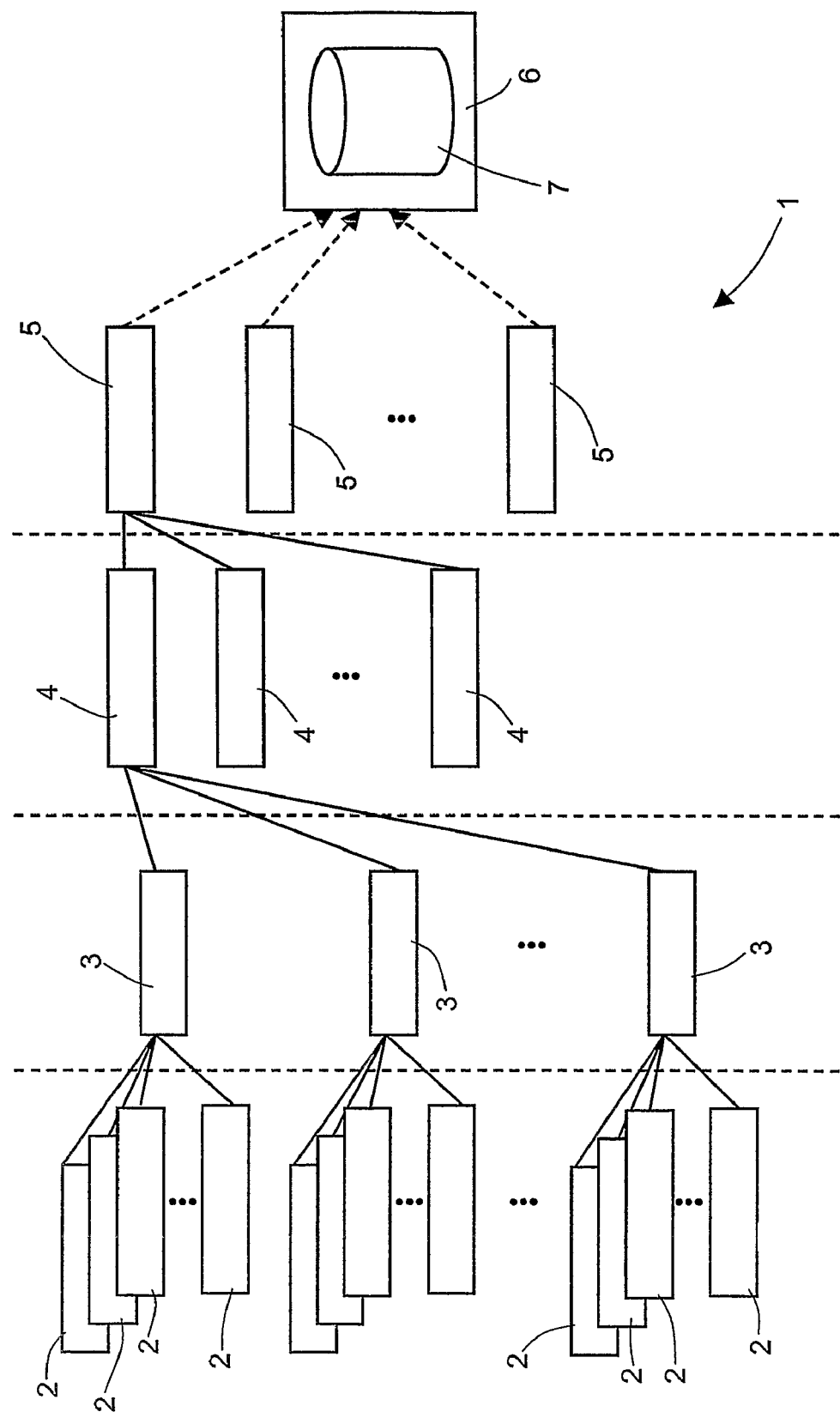
FIG. 3 shows a schematic of grouping of the elementary units of the installation.

The FIG. 3 example shows grouping of the identification codes, and therefore of the relative elementary units 2, in a four-level hierarchical structure organized by devices 3, cabinets 4, and control rooms 5. At the top of the hierarchical structure, control rooms 5 are connected to a central control device 6 comprising a central data bank 7, e.g. a SAP database, for storing and updating information concerning the configuration of installation 1.

Figure 4:
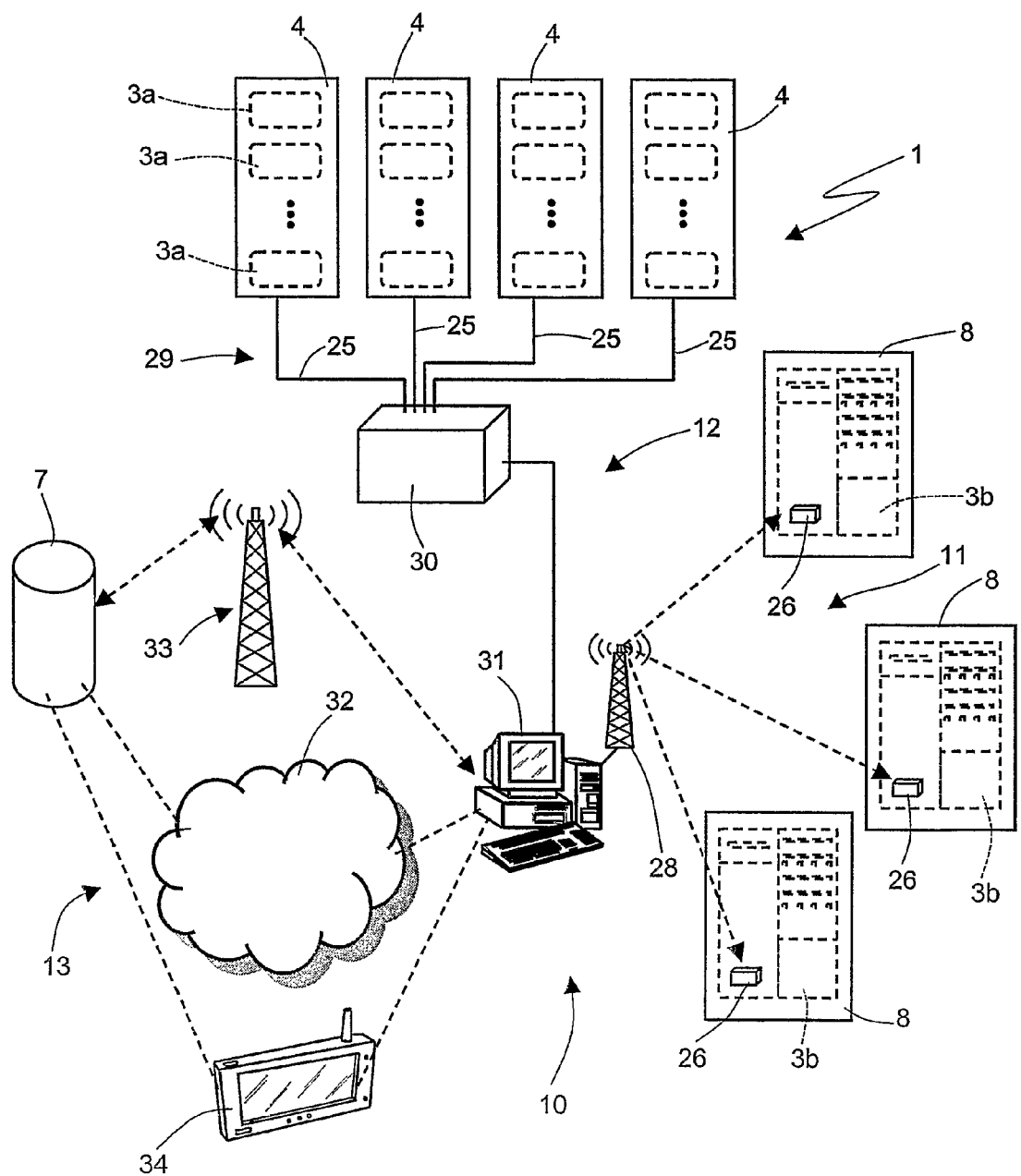
FIG. 4 shows one configuration of the installation and of the relative remote acquisition system associated with a control room in accordance with the present invention.

FIG. 4 shows one configuration of installation 1 associated with a control room 5 (FIG. 3), and which comprises a first number of four cabinets 4, each housing a number of devices forming part of a first main family of devices hereinafter referred to as standard devices 3a; and a second number of three containers 8, each housing a device forming part of a second family of devices hereinafter referred to as non-standard devices 3b.

Figure 5:
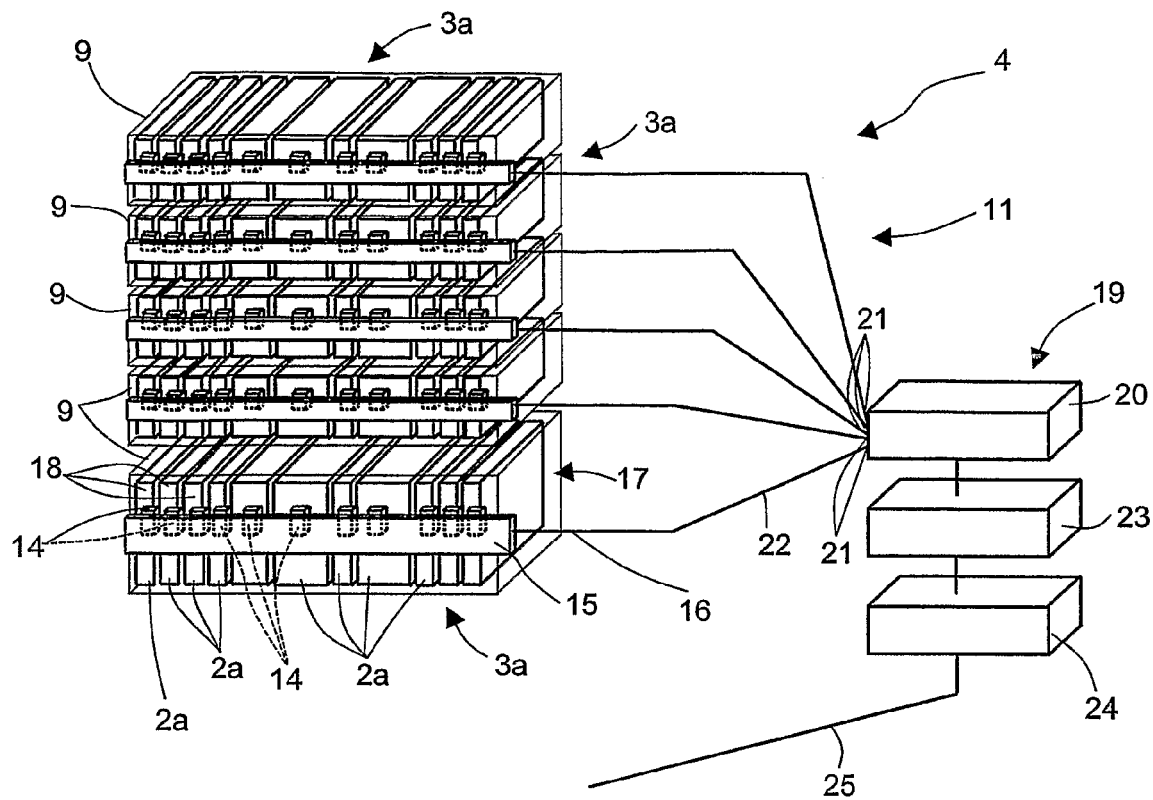
FIG. 5 shows part of the FIG. 4 configuration of the installation and the relative part of the remote acquisition system.

Standard devices 3a are of standard shape and size, and comprise basic elementary units 2 typically organized by cabinets 4 and hereinafter indicated 2a. FIG. 5 shows an example of a cabinet 4 comprising a number of racks 9 for supporting respective standard devices 3a, each in turn comprising a respective number of elementary units 2a.

Figure 6:
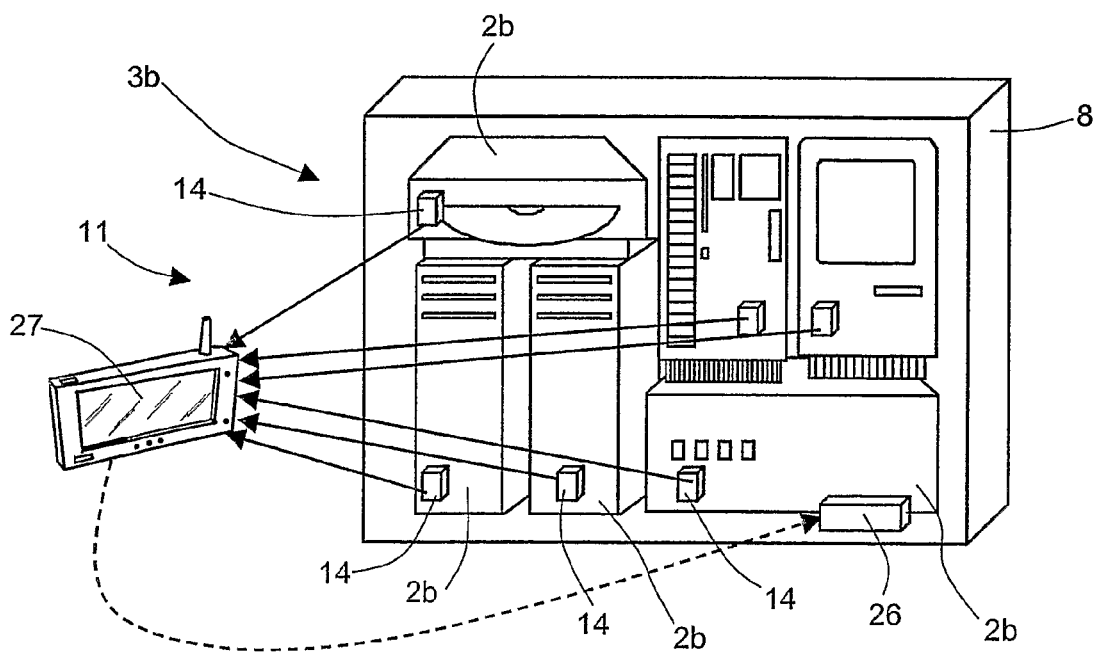
FIG. 6 shows a further part of the FIG. 4 configuration of the installation and the relative part of the remote acquisition system.

FIG. 6 shows a non-standard device 3b, which comprises heterogeneous elementary units 2—such as displays, power supplies, junction-box plates, antennas, TWT devices, mass storage units, customized electronic boards, interfaces, COTS systems, etc.—housed in a relative container 8 normally difficult to access and inspect, and which are hereinafter indicated 2b.

It should be pointed out that no clear distinction exists between standard and non-standard devices 3a and 3b, which may alternate within the levels of the FIG. 3 hierarchical structure.

With reference to FIG. 4, number 10 indicates the STC system of control room 5 according to the present invention. STC system 10 comprises an automatic identification system 11 based on RFid transponder technology to read and/or modify identification data—including the identification code mentioned previously—relative to elementary units 2a, 2b (FIGS. 5 and 6) of installation 1; a data gathering and management system 12 for gathering and organizing data read and/or modified by identification system 11; said central data bank 7 located remotely with respect to installation 1 and for memorizing and updating identification data of all elementary units 2a, 2b alongside configuration changes to installation 1; and a data transmission system 13 for data exchange between data gathering and management system 12 and central data bank 7.

Identification system 11, data gathering and management system 12, and data transmission system 13 substantially reflect the FIG. 3 hierarchical structure, and are technologically interdependent, in the sense that technological choices for one affect the others.

In addition to all the identification data of elementary units 2a, 2b of installation 1, central data bank 7 also memorizes and updates information concerning the hierarchical grouping structure (FIG. 3) of such identification data, so as to form a pool of information available for any servicing of installation 1.

With reference to FIGS. 5 and 6, identification system 11 comprises a number of passive transponders 14, each fitted to, and for memorizing the identification data of, a respective elementary unit 2a, 2b of installation 1.

Passive transponders 14 operate to ISO/IEC standard 15693, i.e. operate at a nominal radiofrequency F1 of 13.56 MHz, and have a memory capacity M1 of 1 Kbit to 2 Kbytes and a read range D1 of 10 to 120 cm.

As shown in FIG. 5, for each rack 9 of cabinet 4, identification system 11 comprises a substantially straight antenna 15, which has an internal impedance of 50 ohms, is 19" long, has a respective antenna output 16, and is mounted longitudinally, by a Velcro fastener (not shown), to a side 17 of respective rack 9. Passive transponders 14 are mounted to walls 18 of respective elementary units 2a facing side 17 of rack 9, so as to facilitate electromagnetic coupling of antenna 15 and passive transponders 14, and so facilitate reading and writing of passive transponders 14.

As shown in FIG. 5, identification system 11 also comprises a control unit 19 integrated in each cabinet 4, and for reading and/or modifying the identification data of elementary units 2a memorized in respective passive transponders 14 in cabinet 4, and for transferring said data between passive transponders 14 in cabinet 4 and data gathering and management system 12 (FIG. 4).

More specifically, control unit 19 comprises an antenna multiplexer device 20 having a number of input ports 21, each connected to a respective antenna output 16 by a respective coaxial cable 22; an RFid read/write device 23, for passive transponders 14, output-connected to antenna multiplexer device 20 and for controlling antennas 15, via antenna multiplexer device 20, one at a time in rotation according to an interrogation cycle having a minimum switching time of 1 msec; and a microcontroller 24 output-connected to RFid read/write device 23 to transfer the identification data of elementary units 2a in cabinet 4 between respective passive transponders 14 and data gathering and management system 12 (FIG. 4) at each interrogation cycle. Control unit 19 is connected to data gathering and management system 12 (FIG. 4) over a respective coaxial output cable 25.

With reference to FIG. 4, identification system 11 comprises a number of active transponders 26, each fitted to container 8 of a respective non-standard device 3b, and for memorizing an inventory of elementary units 2b of non-standard device 3b. The inventory is constructed on the basis of the identification data of elementary units 2b memorized in respective passive transponders 14.

Active transponders 26 operate at a nominal radiofrequency F2 of 868 MHz, have a memory capacity M2 greater than memory capacity M1—more specifically, of up to 64 Kbytes—and have a read range D2 greater than read range D1—more specifically, of 6 to 100 m.

Identification system 11 also comprises at least one updating unit 27 (FIG. 6) for updating the inventories of elementary units 2b of non-standard devices 3b, memorized in respective active transponders 26, with the identification data of all the elementary units 2b memorized in respective passive transponders 14. For which purpose, updating unit 27 has an RFid read/write device (not shown) for passive transponders 14, and an RFid read/write device (not shown) for active transponders 26.

In a further embodiment (not shown) of the present invention, updating unit 27 is portable, i.e. is incorporated, for example, in a portable computer (PDA).

As shown in FIG. 4, identification system 11 also comprises an RFid read/write device 28, for active transponders 26, located in a fixed position at a distance from non-standard devices 3b of no more than maximum read range D2, to read and/or modify the inventory data of elementary units 2b of non-standard devices 3b memorized in respective active transponders 26.

With reference to FIG. 4, data gathering and management system 12 comprises an Ethernet local communication network (LAN) 29 having a repeater device (LAN hub) 30 connected to output cables 25 of control units 19 integrated in cabinets 4; and a host 31 associated with control room 5 and loaded with a program for managing and automating acquisition of the identification data of elementary units 2a, 2b. Host 31 is connected to repeater device 30, to RFid read/write device 28, and to data transmission system 13, to transfer the identification data acquired by identification system 11 to data transmission system 13.

In another further embodiment (not shown) of the present invention, local communication network 29 is a wireless type (WiFi), i.e. operating to IEEE standard 802.11b/g. More specifically, control units 19 (FIG. 5) integrated in cabinets 4 are provided, at the output, with respective WiFi transceivers for radio connection to a WiFi access device ("Access Point") connected to host 31. The access device thus defines a wireless access network with "hot spot" radio coverage.

Data transmission system 13 is bidirectional, in that data must flow to central data bank 7, but peripheral updating must also be possible of the identification data memorized in individual passive transponders 14.

As shown in FIG. 4, data transmission system 13 comprises a fixed telecommunication network 32, e.g. a telephone network; a wide-band network, or any other type of fixed network, connected directly to host 31, over a modem or network board; a radio telecommunication network 33, such as a GPRS, UMTS, satellite network, etc., to which host 31 is connected by a GPRS, UMTS or satellite board; and a portable computer 34 connectable to host 31 and to central data bank 7 by standard communication ports, e.g. RS232, USB, etc., to carry the identification data when fixed telecommunication network 32 and radio telecommunication network 33 cannot be used.

Figure 7:
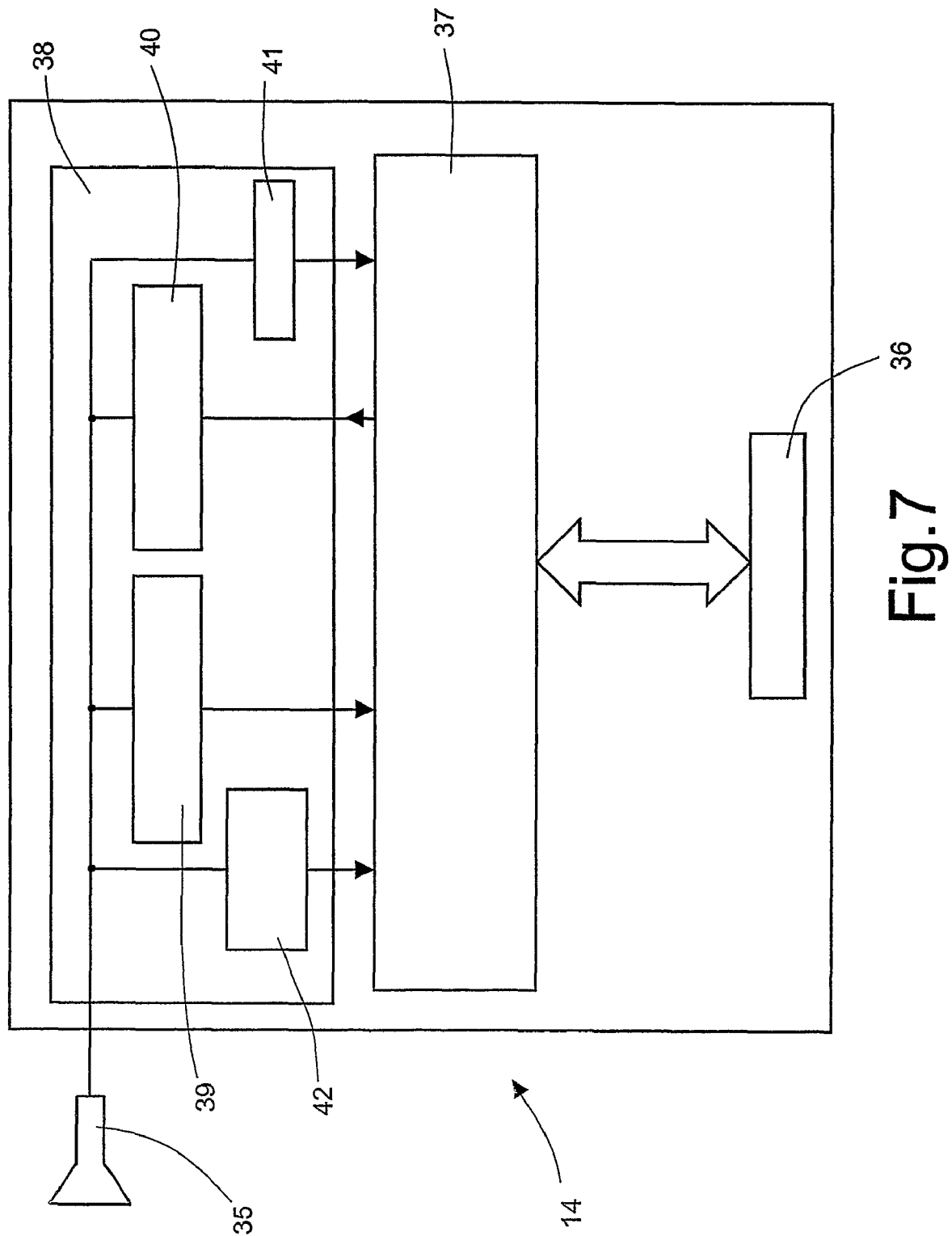
FIG. 7 shows a block diagram of a passive transponder of the part of the remote acquisition system shown in FIGS. 5 and 6.

FIG. 7 shows a block diagram of the passive transponder 14 used in STC system 10 according to the present invention. Passive transponder 14 comprises an antenna 35 designed to guarantee read range D1; a memory 36 having an EEPROM microchip of memory capacity M1 to memorize the identification data of respective elementary unit 2; a digital control block 37 for controlling reading and writing of data in memory 36; and a radiofrequency analog block, hereinafter referred to simply as RF block 38, connected between antenna 35 and digital control block 37 to demodulate and modulate the radiofrequency signals received by and transmitted to antenna 35 respectively.

RF block 38 in turn comprises a demodulating unit 39; a modulating unit 40; a synchronizing unit 41 for generating a synchronous clock signal required for operation of digital control block 37; and a power unit 42 for converting part of the power of the radiofrequency signal received by antenna 35 into direct-voltage power for supply to all the active electronic circuits of passive transponder 14.

Figure 8:
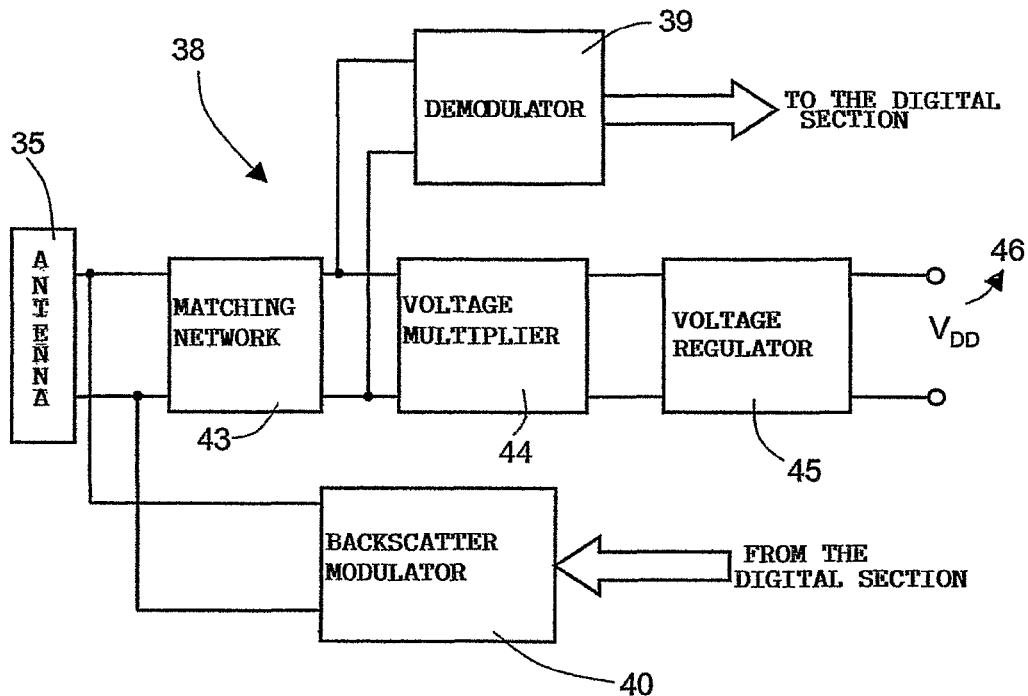
FIG. 8 shows a detail of the FIG. 7 block diagram.

FIG. 8 shows a detail of RF block 38, and in particular a block diagram of power unit 42, which comprises a matching network 43 connected downstream from antenna 35; a voltage multiplier 44 cascade-connected to matching network 43; and a voltage regulator 45 cascade-connected to voltage multiplier 44 and having a direct-voltage power output 46.

Figure 9:
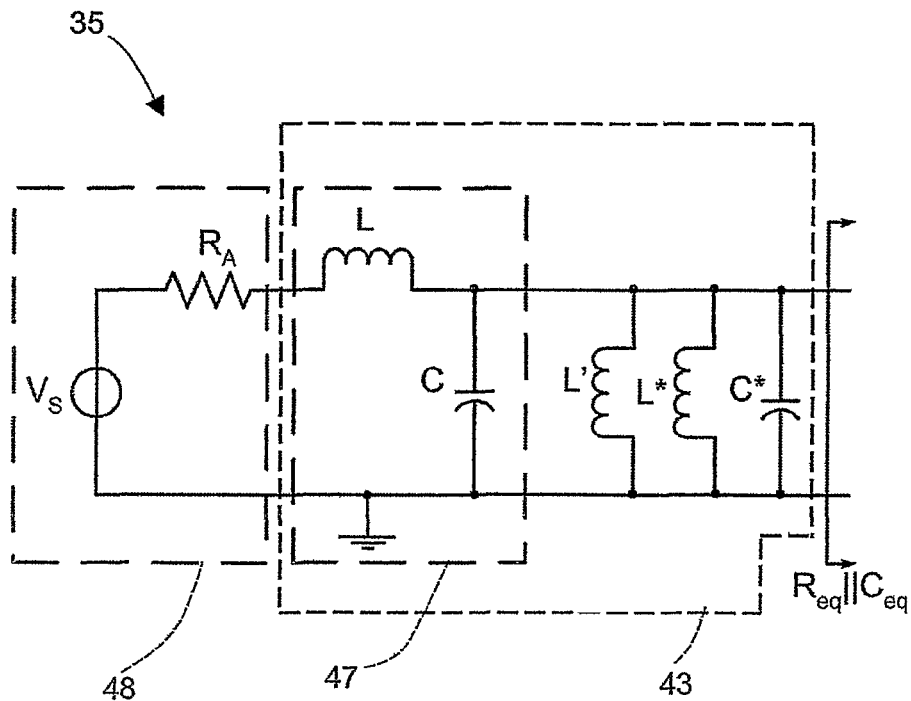
FIG. 9 shows an equivalent circuit representation of the FIG. 8 detail.

With reference to FIG. 9, matching network 43 comprises an LC circuit 47 connected directly to antenna 35 to form a resonant circuit with a resonance frequency equal, in operating conditions, to nominal radiofrequency F1. In FIG. 9, in fact, antenna 35 is represented by an equivalent circuit 48 connected to LC circuit 47 to form an antenna resonant circuit.

When passive transponder 14 is fitted to a wall of elementary unit 2a, 2b made of metal or electrically conducting material, a parasitic capacitance generates between the metal wall and passive transponder 14, which parasitic capacitance adds to the capacitance C of the LC circuit, and reduces the resonance frequency by an amount —hereinafter referred to as frequency shift FS—depending on the type of material. According to the present invention, the capacitance C and inductance L values are designed to bring the freely operating resonance frequency, i.e. in the absence of the metal wall, to a value of $$F1+FS$$

so that, in operating conditions, i.e. when fitted to the metal wall, passive transponder 14 can actually operate at a resonance frequency equal to nominal radiofrequency F1.

"Programmed" frequency shift FS and subsequent realignment, in operating conditions, with nominal value F1 improve the signal/noise S/N ratio of passive transponder 14, i.e. provide for a signal/noise S/N ratio of values typical of operation in high-immunity conditions to ambient electromagnetic noise. Which means passive transponders 14 may even be fitted to elementary units 2a, 2b comprising working electronic circuits, i.e. in the presence of severe electromagnetic noise.

By simply making, and applying passive transponder 14 to, a cross-shaped incision (not shown) on the metal wall of elementary unit 2a, 2b, tests have shown an increase in magnetic coupling between antenna 35 of passive transponder 14 and the antenna of an RFid read/write device 23 interrogating passive transponder 14. This is explained as follows.

Antenna 35 of passive transponder 14 typically comprises a number of metal, substantially complete turns of appropriate length and wound parallel to an antenna plane normally parallel to the metal wall to which passive transponder 14 is applied. The field lines magnetically coupling antenna 35 of passive transponder 14 and the antenna of RFid read/write device 23 (FIG. 5) travel through the turns of antenna 15 perpendicularly to the antenna plane, and are therefore cut by the metal wall. This distortion in magnetic coupling reduces the radiofrequency energy transferred from RFid read/write device 23 to passive transponder 14. In other words, the metal wall amounts to a virtual turn closely coupled magnetically to antenna 35 of passive transponder 14, and antenna 35 and the metal wall combine to actually form a virtual transformer, the primary circuit of which is defined by antenna 35, and the secondary circuit of which is defined by the short-circuited virtual turn, on which most of the radiofrequency energy transmitted by RFid read/write device 23 is dissipated.

Making such a cross-shaped incision on the metal wall, at the point at which antenna 15 of passive transponder 14 is located, therefore opens the virtual turn, thus improving magnetic coupling between antenna 15 of passive transponder 14 and the RFid read/write device 23.

With reference to FIGS. 4, 5 and 6, to update central data bank 7 with the data of all the elementary units 2 of installation 1, this is done as follows.

Data gathering and management system 12 activates host 31 to interrogate control units 19 in cabinets 4 and the RFid read/write device 28 associated with control room 5.

Control unit 19 in each cabinet 4 responds by performing an interrogation cycle—in particular, a read cycle—to read, over relative antennas 15, the identification data of all of elementary units 2a memorized in respective passive transponders 14 in cabinet 4.

RFid read/write device 28, on the other hand, reads the inventories of elementary units 2b of non-standard devices 3b directly from all the active transponders 26. The information in the inventories memorized in active transponders 26 is kept updated by updating unit 27 with the identification data of elementary units 2b memorized in respective passive transponders 14.

At this point, host 31 gathers the identification data read from passive transponders 14 in cabinets 4 and from active transponders 26, and organizes it for transfer over data transmission system 13 to central data bank 7, thus permitting remote, automatic acquisition of the configuration of installation 1.

STC system 10 according to the present invention, has the following main advantages:

it provides, in practically one read and/or write operation, for interrogating all the passive transponders 14 and active transponders 26 substantially simultaneously, thus permitting fast, automatic, remote, collision-free identification of all the elementary units 2a, 2b of installation 1;

it can be applied to any configuration of installation 1, in terms of combinations of active transponders 26 and passive transponders 14;

each transponder may contain the history of a given elementary unit 2a, 2b, e.g. specific authorization of divisions or individuals to work on the unit, material and organizational flow involved in producing, marketing and supplying the unit, etc.; and technical documentation and spare parts catalogues, nowadays mostly available in electronic form, may be used to provide operatives and maintenance personnel of installation 1 with the exact configuration of installation 1 in terms of installed elementary units 2.

STC system 10 according to the present invention also has the following further advantages:

it eliminates or at least reduces the effect of stray capacitances between passive transponder 14 and the metal walls of elementary units 2a, 2b of installation 1, to which passive transponder 14 is fitted;

it reduces the signal/noise S/N ratio of passive transponder 14 to values enabling passive transponder 14. to be applied to functioning electronic circuits; and it improves magnetic coupling between antenna 35 of passive transponder 14 and the antenna of the interrogating RFid read/write device 23.

The invention claimed is:

1. A system for automatically remotely determining a configuration of an installation comprising a number of first devices, each comprising a number of first elementary units, and a number of second devices, each comprising a number of second elementary units, the first devices being of a different type than the second devices, the system comprising:
 a number of first passive transponders, each configured to store identification data of a corresponding first elementary unit;
 a number of second passive transponders, each configured to store identification data of a corresponding second elementary unit;
 a number of active transponders, each associated with a corresponding second device, and configured to store identification data of the second elementary units thereof;
 a portable updating device operable to update identification data stored in an active transponder fitted to a second device with identification data stored in the second passive transponders fitted to the second elementary units of the second device;
 a stationary transponder read/write system operable to automatically read identification data out from or write identification data in the first passive transponders and the active transponders;
 a data gathering system coupled to the stationary transponder read/write system and operable to automatically gather identification data read out from the first passive transponders and the active transponders; and
 a storage system coupled to the data gathering system to store the gathered identification data.

2. The system of claim 1, for an installation comprising a number of cabinets, each housing a number of the first devices;
 the stationary transponder read/write system comprising:
 a number of stationary transponder read/write devices, each associated with a corresponding cabinet and operable to automatically read identification data out from or write identification data in the first passive transponders in the corresponding cabinet;
 each stationary transponder read/write device comprising:
 a number of antennas arranged in the corresponding cabinet;
 an antenna multiplexer coupled to the antennas; and
 a transponder reader/writer coupled to, and operable to cause the, antenna multiplexer to operate the antennas one at a time according to an interrogation cycle.

3. The system of claim 2, wherein the first passive transponders are so fitted to the first elementary units, and the antennas are so arranged in the cabinet such that an antenna faces the first passive transponders fitted to the first elementary units of a corresponding first device.

4. The system of claim 1, wherein the stationary transponder read/write system further comprises:
 a stationary transponder read/write device operable to automatically read identification data out from or write identification data in the active transponders.

5. The system of claim 1, wherein the data gathering system comprises a stationary host computer programmed to automatically acquire and manage the gathered identification data, and a local communication network configured to connect the stationary host computer and the stationary transponder read/write system.

6. The system of claim 5, wherein the local communication network is an Ethernet communication network including a repeater operable to connect the stationary transponder read/write devices to the host computer.

7. The system of claim 5, wherein the local communication network is a wireless communication network including wireless transceivers connected to the stationary transponder read/write devices, and an access point connected to the stationary host computer and configured to communicate with the wireless transceivers.

8. The system of claim 1, wherein the storage system comprises a remote central database, and a data transmission system configured to connect the remote central database and the data gathering system.

9. The system of claim 8, wherein the data transmission system includes a fixed telecommunication network, a radio telecommunication network, and a portable computer for use to connect the remote central database and a stationary host computer when the fixed and radio telecommunication networks are out of order.

10. The system of claim 1, wherein a transponder, which is intended to be fitted to a metal structure, is designed to operate at a nominal operating frequency which is different from an actual operating frequency, at which the transponder will actually operate when fitted to the metal structure, of a frequency shift that depends on the parasitic capacitance that is produced between the metal structure and the transponder when the latter is fitted to the metal structure.

11. A system for automatically remotely determining a configuration of an installation comprising a number of first devices, each comprising a number of first elementary units, and a number of second devices, each comprising a number of second elementary units, the first devices being of a different type than the second devices, the system comprising:
 a number of first passive transponders configured to store identification data of a corresponding first elementary unit;
 a number of second passive transponders configured to store identification data of a corresponding second elementary unit;
 a number of active transponders associated with a corresponding second device and configured to store identification data of the second elementary units thereof;
 a portable updating device operable to update identification data stored in an active transponder fitted to a second device with identification data stored in the second passive transponders;
 a stationary transponder read/write system operable to automatically read identification data out from or write identification data in the first passive transponders and the active transponders; and
 a data gathering system coupled to the stationary transponder read/write system and operable to automatically gather identification data read out from the first passive transponders and the active transponders.

12. The system of claim 11, for an installation comprising a number of cabinets, each housing a number of the first devices;

the stationary transponder read/write system comprising:
a number of stationary transponder read/write devices, each associated with a corresponding cabinet and operable to automatically read identification data out from or write identification data in the first passive transponders in the corresponding cabinet;

each stationary transponder read/write device comprising:
a number of antennas arranged in the corresponding cabinet;
an antenna multiplexer coupled to the antennas; and
a transponder reader/writer coupled to, and operable to cause the, antenna multiplexer to operate the antennas one at a time according to an interrogation cycle.

13. The system of claim 12, wherein the first passive transponders are so fitted to the first elementary units, and the antennas are so arranged in the cabinet such that an antenna faces the first passive transponders fitted to the first elementary units of a corresponding first device.

14. The system of claim 11, wherein the stationary transponder read/write system further comprises:
a stationary transponder read/write device operable to automatically read identification data out from or write identification data in the active transponders.

15. The system of claim 11, wherein the data gathering system comprises a stationary host computer programmed to automatically acquire and manage the gathered identification data, and a local communication network configured to connect the stationary host computer and the stationary transponder read/write system.

16. The system of claim 15, wherein the local communication network is an Ethernet communication network including a repeater operable to connect the stationary transponder read/write devices to the stationary host computer.

17. The system of claim 15, wherein the local communication network is a wireless communication network including wireless transceivers connected to the stationary transponder read/write devices, and an access point connected to the stationary host computer and configured to communicate with the wireless transceivers.

18. The system of claim 11, further including a storage system coupled to the data gathering system to store the gathered identification data and wherein the storage system comprises a remote central database, and a data transmission system configured to connect the remote central database and the data gathering system.

19. The system of claim 18, wherein the data transmission system includes a fixed telecommunication network, a radio telecommunication network, and a portable computer for use to connect the remote central database and a stationary host computer when the fixed and radio telecommunication networks are out of order.

20. The system of claim 11, wherein a transponder, which is intended to be fitted to a metal structure, is designed to operate at a nominal operating frequency which is different from an actual operating frequency, at which the transponder will actually operate when fitted to the metal structure, of a frequency shift that depends on the parasitic capacitance that is produced between the metal structure and the transponder when the latter is fitted to the metal structure.

* * * * *